Patented May 14, 1940

2,201,098

UNITED STATES PATENT OFFICE 2,201,098

PREPARATION FOR CLEANING REMOVABLE DENTURES

Orville E. McKim, Port Chester, N. Y.

No Drawing. Application April 25, 1938,
Serial No. 204,254

6 Claims. (Cl. 167—93)

This invention relates to the cleaning of removable dentures, and more particularly to a preparation for this purpose. Preparations of this type heretofore available have been unsatisfactory because such preparations have either lacked the necessary ability to penetrate and dissolve mucin plaque accumulations on removable dentures, have contained insoluble polishing agents which wear down and damage the suction and contact surfaces provided to hold the denture in place and thus causing the denture to slip, or have contained poisonous ingredients which require extensive rinsing before the denture can be safely replaced in the oral cavity. An additional objection to the inclusion of strong alkalis in a cleaning preparation of this type is that the alkali reacts on the bristles of brushes used to apply the preparation so as to soften them and cause their rapid disintegration. Prior to the present invention, no liquid preparation for cleaning removable dentures has been known which is capable of efficiently penetrating and dissolving mucin plaque accumulations.

It is an object of the present invention, therefore, to provide a preparation for cleaning removable dentures which comprises an ingredient capable of efficiently penetrating and dissolving mucin plaque accumulations.

In accordance with the present invention, there is provided a preparation of a saturated aqueous solution of citric acid, isopropyl alcohol and distilled water with suitable agents for giving the preparation a pleasant odor and flavor and whatever color may be desired.

As a specific example of the proportions of the various ingredients used in this preparation, I recite the following:

| | |
|---|---|
| Saturated aqueous solution of citric acid | dram 1 |
| Isopropyl alcohol | drams 15 |
| Oil of spearmint | drops 10 |
| Oil of neutroleum | do 4 |
| Saccharin | grains 8 |
| Distilled water | ounces 2 |

The oil of spearmint and saccharin provide a palatable flavor and the oil of neutroleum imparts a pleasing aroma. To the above, there should be added any desired coloring agent of harmless nature.

It has been found that the preparation of this invention is effective to clean thoroughly removable dentures. The combination of the active ingredients, citric acid acting with isopropyl alcohol provides sufficient hydrogen ion concentration to penetrate and dissolve mucin plaque accumulations very rapidly, easily and thoroughly. Thus, the teeth are effectively cleaned without undue brushing. The preparation of this invention by completely dissolving mucin plaque accumulations maintains the suction and contact surfaces of removable dentures free from the nucleus required for mucin deposit and thereby retards the formation of new mucin deposits. This greatly decreases the danger of infection because mucin plaque accumulations are most suitable media for the harboring and growth of bacteria. The complete removal of mucin plaque accumulations accomplished by the preparation of this invention is particularly important in the case of removable dentures. In such cases if mucin plaque accumulations are not entirely removed, hard particles of food may become lodged therein and cause bruises to the gums during the biting or mastication functions. Further, if a removable denture does not have a completely mucin free surface, it definitely interferes with the suction necessary to hold the plate forming the artificial denture firmly in place.

The ingredients of the preparation of the present invention are neither poisonous nor irritating. They are entirely harmless to the human system.

While the proportions of the active ingredients, citric acid and isopropyl alcohol, in the preparation are not critical, I have found that best results are obtained when the preparation contains approximately equal parts by volume of these ingredients and distilled water. Such a preparation contains sufficient strength to properly and rapidly penetrate and dissolve mucin plaque accumulations and while preparations using a smaller proportion of active ingredients may be used, the penetrating and dissolving action of the preparation is relatively reduced because that action depends upon the degree of acidity, that is, sufficient hydrogen ion concentration in the preparation.

While there has been described what at present is considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A liquid preparation for cleaning removable dentures containing citric acid and isopropyl alcohol and having sufficient acid reaction in combination with the isopropyl alcohol to penetrate and dissolve the mucin plaques on said dentures.

2. A liquid preparation for cleaning removable dentures containing substantially fifty per cent by volume a combination of citric acid and isopropyl alcohol and having sufficient acid reaction in combination with the isopropyl alcohol to penetrate and dissolve the mucin plaques on said dentures.

3. A liquid preparation for cleaning removable dentures comprising a solution of citric acid and isopropyl alcohol in water and having sufficient hydrogen ion concentration in combination with the isopropyl alcohol to penetrate and dissolve the mucin plaques on said dentures.

4. A liquid preparation for cleaning removable dentures comprising a solution of a combination of citric acid and isopropyl alcohol in water of volume substantially equal to that of said combination, said preparation containing sufficient hydrogen ion concentration in combination with the isopropyl alcohol to penetrate and dissolve the mucin plaques on said dentures.

5. A liquid preparation for cleaning removable dentures comprising substantially equal parts by volume of a combination of acid reactive mucin dissolving ingredients and water, said combination comprising substantially one part by volume of a saturated aqueous solution of citric acid and fifteen parts of isopropyl alcohol.

6. A liquid preparation for cleaning removable dentures comprising a combination having an acid reaction of ingredients for penetrating and dissolving mucin plaque accumulations on said dentures, consisting of substantially one part of a saturated aqueous solution of citric acid and fifteen parts of isopropyl alcohol, said combination being in an aqueous solution.

ORVILLE E. McKIM.